(12) United States Patent
Lizenby et al.

(10) Patent No.: US 7,591,491 B2
(45) Date of Patent: Sep. 22, 2009

(54) CLAMP FOR AN ANODELESS RISER, AND METHODS OF CONSTRUCTING AND UTILIZING SAME

(76) Inventors: Brian John Lizenby, 121 George St., Cadillac, MI (US) 49601; Charles Edward Jennings, 22594 150th Ave., Tustin, MI (US) 49688

( * ) Notice: Subject to any disclaimer, the term of this patent is extended or adjusted under 35 U.S.C. 154(b) by 195 days.

(21) Appl. No.: 11/611,853

(22) Filed: Dec. 16, 2006

(65) Prior Publication Data
US 2007/0158940 A1 Jul. 12, 2007

Related U.S. Application Data

(60) Provisional application No. 60/766,331, filed on Jan. 11, 2006.

(51) Int. Cl.
*F16L 21/00* (2006.01)
(52) U.S. Cl. .......................... 285/419; 285/15
(58) Field of Classification Search ................. 285/419, 285/373, 15, 115
See application file for complete search history.

(56) References Cited

U.S. PATENT DOCUMENTS

| 266,483 | A | * | 10/1882 | Kruesi | 285/406 |
|---|---|---|---|---|---|
| 631,867 | A | * | 8/1899 | Beaver | 285/373 |
| 793,135 | A | * | 6/1905 | Kellogg | 285/373 |
| 1,083,756 | A | * | 1/1914 | Phelps | 285/406 |
| 1,589,917 | A | * | 6/1926 | Williams | 285/419 |
| 2,094,258 | A | * | 9/1937 | Thompson | 285/373 |
| 2,450,458 | A | * | 10/1948 | Thompson et al. | 285/395 |
| 3,944,260 | A | * | 3/1976 | Petroczky | 285/15 |
| 4,015,634 | A | * | 4/1977 | Christie | 285/373 |
| 4,807,912 | A | * | 2/1989 | Maier | 285/348 |
| 5,090,742 | A | * | 2/1992 | Cohen et al. | 285/114 |
| 5,092,631 | A | * | 3/1992 | Masnik et al. | 285/419 |
| 5,316,348 | A | * | 5/1994 | Franklin | 285/39 |
| 5,562,313 | A | * | 10/1996 | Piniaev et al. | 285/419 |
| 5,857,711 | A | * | 1/1999 | Comin-DuMong et al. | 285/115 |
| 5,895,076 | A | * | 4/1999 | Elliott | 285/419 |
| 6,276,726 | B1 | * | 8/2001 | Daspit | 285/15 |
| 6,305,719 | B1 | * | 10/2001 | Smith et al. | 285/15 |
| 7,147,509 | B1 | * | 12/2006 | Burris et al. | 439/578 |

* cited by examiner

*Primary Examiner*—David E Bochna
(74) *Attorney, Agent, or Firm*—Weiner & Burt, P.C.; Irving M. Weiner; Pamela S. Burt

(57) ABSTRACT

A repair clamp made of heavy-duty plastic material. The repair clamp is used to fix a problem on an anodeless riser. The clamp has two sides and six stainless steel bolts and nuts.

1 Claim, 1 Drawing Sheet

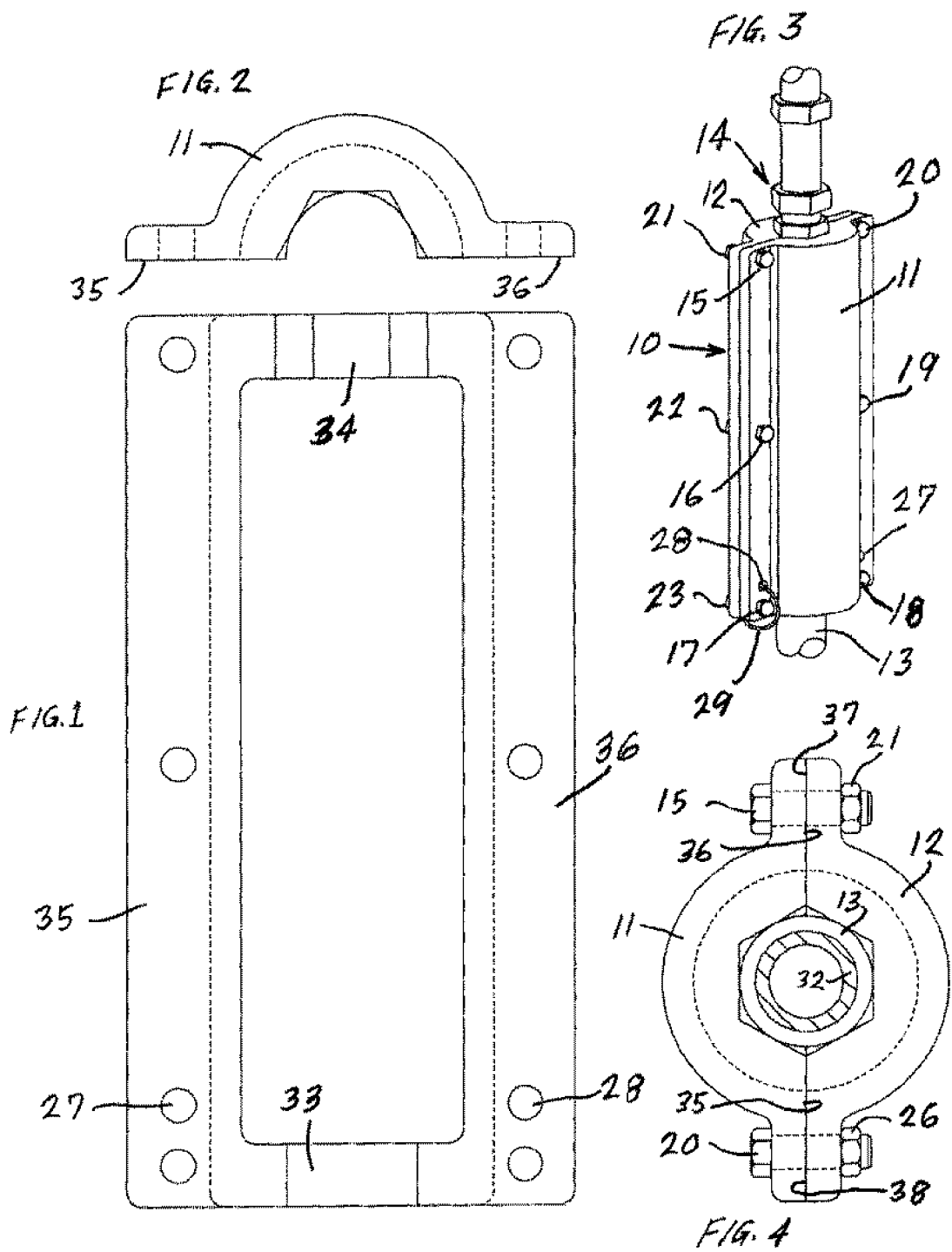

CLAMP FOR AN ANODELESS RISER, AND METHODS OF CONSTRUCTING AND UTILIZING SAME

CROSS-REFERENCE TO RELATED APPLICATIONS

The present patent application is based on and claims priority from U.S. Provisional Patent Application Ser. No. 60/766,331 filed on Jan. 11, 2006.

STATEMENT REGARDING FEDERALLY SPONSERED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates to a novel and unique clamp for an anodeless riser, and methods of constructing and utilizing same.

More particularly, the present invention relates to a heavy-duty repair clamp which uses an anodeless riser having a grey shield to protect a plastic gas line, and methods of constructing and utilizing same.

The term "anodeless riser" as used herein means a metallic casing with a non-metallic pipe disposed within the metallic casing, and wherein cathodic protection is not necessary because the outside metallic casing does not carry the fluid therein.

In the gas industry, an anodeless riser takes the form of a steel casing with a plastic pipe inside. The plastic pipe inside the steel casing is the service line carrying gas to the meter of a customer.

The primary advantage of an anodeless riser is that it does not have to be cathodically protected because the outside steel casing is not the gas carrier. The plastic pipe inside the steel casing is the gas carrier. When installing steel risers connected to a plastic pipe by a transition fining, one should make sure that the steel riser is coated and cathodically protected.

Heretofore, the gray steel shields used on the anodeless risers have begun to pull away from the transition coupling. This causes the plastic coupling to be exposed to the sunlight, and also provides potential for external damage, such as from weed whackers.

The present invention solves the aforementioned problem, and also provides an invention which can be used not only for repairing, but for initial installations.

It is a desideratum of the present invention to avoid the animadversions of the conventional and present techniques and devices, and to provide a simple solution to such problems.

SUMMARY OF THE INVENTION

The present invention provides a clamping apparatus an anodeless riser, comprising: two half clamping members having interior portions shaped to receive therewithin and surround said anodeless riser; connection means for releasably and selectively securing together said two half clamping members with said anodeless riser received therewithin; and said two half clamping members being provided with exterior portions which facilitate operation of said connection means.

The present invention provides a clamp, which can be used as a repair clamp or for initial installations, to avoid and/or to fix the aforementioned problem with anodeless risers.

The present invention provides a clamp as described hereinabove, wherein the clamp is fabricated from a heavy-duty plastic type material.

The present invention provides a clamp as described hereinabove, wherein the clamp has two side portions and six stainless steel bolts and nuts.

It is a primary object of the present invention to provide a clamp as described hereinabove wherein the clamp protects the plastic gasline from being exposed to sunlight and any potentials of external damage.

Other objects, advantages, and features of the present invention will become apparent to those persons skilled in this particular area of technology and to other persons after having been exposed to the present patent application when read in conjunction with the accompanying patent drawings.

BRIEF DESCRIPTION OF THE DRAWINGS

FIG. 1 illustrates an elevational view of one-half of a clamp in accordance with a preferred embodiment of the present invention, FIG. 2 shows a top plan view of the FIG. 1 device.

FIG. 3 illustrates a perspective view of the clamp in accordance with the present invention being mounted on a gas service line.

FIG. 4 depicts a top plan view of the FIG. 3 arrangement.

DETAILED DESCRIPTION OF THE INVENTION

With reference to FIGS. 1-4, there is shown the novel clamp device 10 having two identical half portions 11 and 12.

The service adaptor 14 includes an interior plastic pipe 32 which is the gas carrier, and an external protective metallic casing or shield 13.

Each half portion 11 and 12 of the novel clamp device 10 includes a bottom interior curved portion 33 and an upper interior hex-shaped 34 to accommodate and surround the service adaptor 14 therewithin.

For installing the clamp 10, any exposed metallic casing or shield 13 should be prepared in accordance with corrosion procedures.

Thereafter, any conventional clamps, which are attached to the protective metallic casing or shield 13, such as hose clamps, should be removed. Then, one half portion 11 or 12 of the clamp device 10 should be put over the service adaptor 14, and matched up with the other half portion 12 or 11, respectively, of the clamp device 10.

Thereafter, there should be installed the six stainless steel bolts 15, 16, 17, 18, 19 and 20 and nuts 21, 22, 23, 24, 25 and 26 leaving the two holes 27 and 28 of the clamp device 10 open for tagging or to attach a locating wire 29, if required.

Then, the bolts 15, 16, 17, 18 and 29 should be tightened until both flanges 35, 36, 37 and 38 of the clamp device 10 are in contact, but not overtightened.

There has been illustrated in the accompanying drawings and described hereinabove only one unique and novel embodiment of the present invention which can be practiced and constructed in many different configurations, arrangements of components, sizes, and shapes.

It should be understood that many changes, modifications, variations, and other uses and applications will become apparent to those persons skilled in this particular area of technology and to others after having been exposed to the present patent specification and accompanying drawings.

Any and all such changes, modifications, variations and other uses and applications which do not depart from the spirit and scope of the present invention are therefore covered by and embraced within the present invention and the patent claims set forth hereinbelow,

The invention claimed is:

1. A clamping apparatus, comprising, in combination:
   a service adaptor for a natural gas service line;
   said natural gas service adaptor including a non-tapering hex-shaped member and an anodeless riser;
   said anodeless riser comprises an outer steel casing and an inner plastic pipe;
   said inner plastic pipe carrying the natural gas;
   two half clamping members having non-tapering interior portions shaped to receive therewithin and surround said natural gas service adaptor and said anodeless riser;
   said two half clamping members are identical;
   said two identical half clamping members are completely separate and unattached to each other;
   said two identical separate half clamping members are fabricated from a heavy-duty plastic type material;
   connection means for releasably and selectively securing together said two identical separate half clamping members with said natural gas service adaptor and said anodeless riser received therewithin;
   said two identical separate half clamping members being provided with non-tapering exterior portions which facilitate operation of said connection means;
   said non-tapering exterior portions of said two identical separate half clamping members include mating flanges provided with a predetermined number of apertures arranged in a predetermined geometric pattern;
   said apertures are aligned in two, and only two, straight lines which are parallel to each other;
   said connection means includes bolts and nuts therefor;
   said mating flanges are shaped and arranged to align pairs of said apertures for passage therethrough of said bolts for releasably and selectively securing together said two identical separate half clamping members with said natural gas service adaptor and said anodeless riser received therewithin, and to align a predetermined pair of said apertures for tagging said clamping apparatus;
   said non-tapering interior portions of said two identical separate half clamping members are provided with a non-tapering interior hex-shaped section at an upper portion of said two identical separate half clamping members, and a non-tapering interior curved section at a bottom portion of said two identical separate half clamping members;
   said non-tapering interior hex-shaped sections accommodate, surround and mate with said non-tapering hex-shaped member of said natural gas service adaptor;
   said non-tapering interior curved sections accommodate, surround and mate with said anodeless riser; and
   a locating wire disposed through said predetermined pair of said aligned apertures to tag said clamping apparatus.

* * * * *